2,856,266
STABILIZING SULPHURIC ANHYDRIDE

Raymond Beau, Massy, France, assignor to Société Anonyme des Manufactures des Glaces et Produits Chimiques de Saint-Gobain, Chauny et Cirey, Paris, France No Drawing. Application July 24, 1956
Serial No. 599,699

Claims priority, application France August 29, 1955

6 Claims. (Cl. 23—174)

This invention relates to improvements in stabilizing sulphuric anhydride.

Pure sulphuric anhydride, $SO_3$ is difficult to use in industry because of its instability which consists in the fact that the anhydride freshly distilled does not maintain its liquid state for a long period of time at room temperature (melting point 16.8° C.). It polymerizes rapidly particularly in the presence of traces of humidity, in various polymers among which the principal ones are the beta form melting at 32° C., and the alpha form, which sublimes at 45° C. and may be melted, only under pressure, at 62° C.

As a consequence, it has been proposed to stabilize sulphuric anhydride in its less polymerised forms which are easily fusible and distillable.

The object of this invention is to stabilize sulphuric anhydride.

According to the invention sulphuric anhydride is stabilized by the addition of a stabilizing quantity of oxalyl chloride COCl—COCl.

The applicant has discovered that the addition to sulphuric anhydride of oxalyl chloride, even in minor proportions lower than 2% by weight, prevents its polymerisation and consequently permits its conservation during a considerable period of time, i. e., several months in the forms in which it is easily liquefiable, provided that it is preserved from humidity. Preferably the oxalyl chloride is added to sulphuric anhydride in the amount of from 0.5 to 2.5% by weight based upon the weight of the sulphuric anhydride.

The precise percentage of stabilizing agent to use will vary according the purpose i. e. the degree of stabilization wanted and the desired of eventual polymerisation.

The stabilizing agent may be introduced in the sulphuric anhydride by all known means, such as by the single mixing at room temperature. If desired, however the dissolving of the oxalyl chloride in the sulphuric anhydride may be facilitated by a slight heating of the sulphuric anhydride or of the mixture.

In order to appreciate the stabilizing effect obtained according to the process of the invention the following tests have been carried out: Liquid sulphuric anhydride samples, freshly distilled from oleum were treated with oxalyl chloride added thereto and sealed in glass tubes. These tubes were then subjected to 22 cycles of cooling and reheating, each cycle beginning by a cooling to 0° C. for a period of 20 hours, the tube being then reheated up to 40° C. for a period of about 4 hours, such a cycle of 24 hours being repeated during 22 days. At the end of these tests, the percentage of beta and alpha polymers was determined.

*1st test*

To sulphuric anhydride which issued from a double distillation of a 60% oleum there was added 1.18% by weight of oxalyl chloride. After 22 cooling and reheating cycles, the mixture remained still completely in a liquid state at a temperature of 16.8° C. with the exception of a very small percentage, lower than 0.5%, of alpha polymer.

*2nd test*

The preceding test was repeated using 2.01% by weight of oxalyl chloride as a stabilizing agent. The mixture was still completely liquid at 16.8° C. after 22 cooling and reheating cycles.

As many apparently widely different embodiments of the present invention may be made without departing from the spirit and scope thereof, it is to be understood that the invention is not limited to the specific embodiments disclosed.

That which is claimed is:

1. A process for the stabilization of sulphuric anhydride which comprises adding thereto a stabilizing quantity of oxalyl chloride.

2. A process for the stabilization of sulphuric anhydride which comprises adding thereto from 0.5 to 2.5% by weight of oxalyl chloride based upon the weight of the sulphuric anhydride.

3. Sulphuric anhydride containing a stabilizing quantity of oxalyl chloride.

4. Sulphuric anhydride containing from 0.5% to 2.5% by weight of oxalyl chloride based upon the weight of the sulphuric anhydride.

5. A process for the stabilization of sulphuric anhydride which comprises adding thereto a quantity of oxalyl chloride which is effective in stabilizing the sulphuric anhydrde so that it remains substantially completely liquid for at least one month at room temperature.

6. Sulphuric anhydride containing a quantity of oxalyl chloride which is effective in stabilizing the sulphuric anhydride so that it remains substantially completely liquid for at least one month at room temperature.

References Cited in the file of this patent

UNITED STATES PATENTS 2,403,459     Rollinson _____ July 9, 1946